United States Patent [19]

Dobrzynski

[11] Patent Number: 5,066,195
[45] Date of Patent: Nov. 19, 1991

[54] PROPELLER FOR AIRCRAFT OR THE LIKE

[75] Inventor: Werner M. Dobrzynski, Wolfenbüttel, Fed. Rep. of Germany

[73] Assignee: Deutsche Forschungsanstault Für Luft- Und Raumfahrt e.V., Cologne, Fed. Rep. of Germany

[21] Appl. No.: 550,379

[22] Filed: Jul. 10, 1990

Related U.S. Application Data

[63] Continuation of Ser. No. 259,854, Oct. 19, 1988, abandoned.

[30] Foreign Application Priority Data

Oct. 27, 1987 [DE] Fed. Rep. of Germany ....... 3736141

[51] Int. Cl.⁵ .............................................. B64C 11/48
[52] U.S. Cl. .................................. 416/200 R; 416/124; 416/127
[58] Field of Search ............... 416/200 R, 200 A, 124, 416/127; 415/119

[56] References Cited

U.S. PATENT DOCUMENTS

| 921,423 | 5/1909 | MacKaness | 416/200 R |
|---|---|---|---|
| 1,073,413 | 9/1913 | Faehrmann | 416/200 R |
| 1,868,008 | 7/1932 | Gardner | 415/119 |
| 1,944,525 | 1/1934 | Pereyra | 416/200 R |
| 2,126,221 | 8/1938 | Sessums | 416/124 |
| 2,691,419 | 10/1954 | Anderson | 416/200 R |
| 3,023,813 | 3/1962 | Fengler | 416/124 |
| 3,592,559 | 7/1971 | Ward | 416/127 |
| 3,830,587 | 8/1974 | Shipes et al. | 416/200 R |
| 4,483,658 | 11/1984 | Levine | 416/200 R |
| 4,514,146 | 4/1985 | Nojiri et al. | 416/200 R |
| 4,676,459 | 6/1987 | Seefluth | 416/124 |

FOREIGN PATENT DOCUMENTS

| 1503647 | 3/1969 | Fed. Rep. of Germany ... 416/200 R |
|---|---|---|
| 2429910 | 1/1980 | France . |
| 16687 | of 1912 | United Kingdom ............ 416/200 R |

Primary Examiner—John T. Kwon
Attorney, Agent, or Firm—Gottlieb, Rackman & Reisman

[57] ABSTRACT

A propeller for an aircraft or a blower or fan, wherein the propeller blades are intended for operation at speeds characterized by blade tip Mach numbers in the range of about 0.4 to 0.8, comprises at least two pairs of diametrically opposed blades, the blade pairs being arranged at a spacing angle ε of between about 15° and 50° between them, and the magnitude of the spacing angle being inversely related to the magnitude of the blade tip Mach numbers, thereby to effect a reduction in the level of the rotational sound harmonics by interference. The pairs of blades may be axially spaced from one another, i.e., arranged in respective spaced parallel planes of rotation, shifted, with the rear one of two adjacent blades leading in the direction of rotation.

6 Claims, 5 Drawing Sheets

Fig. 5
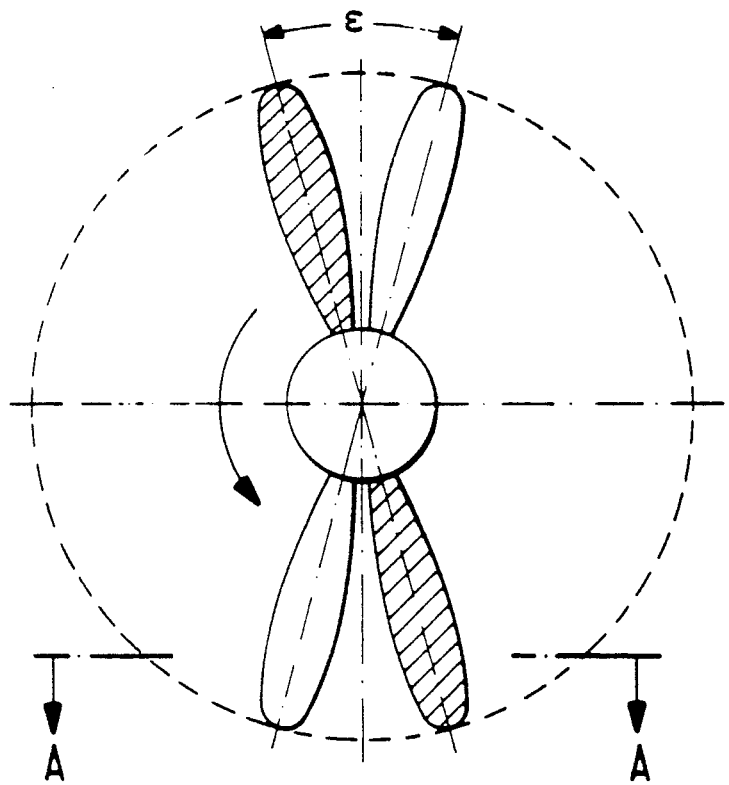
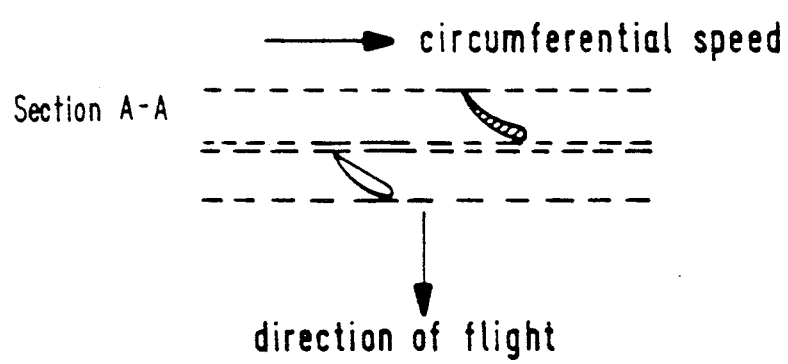
Fig. 5A

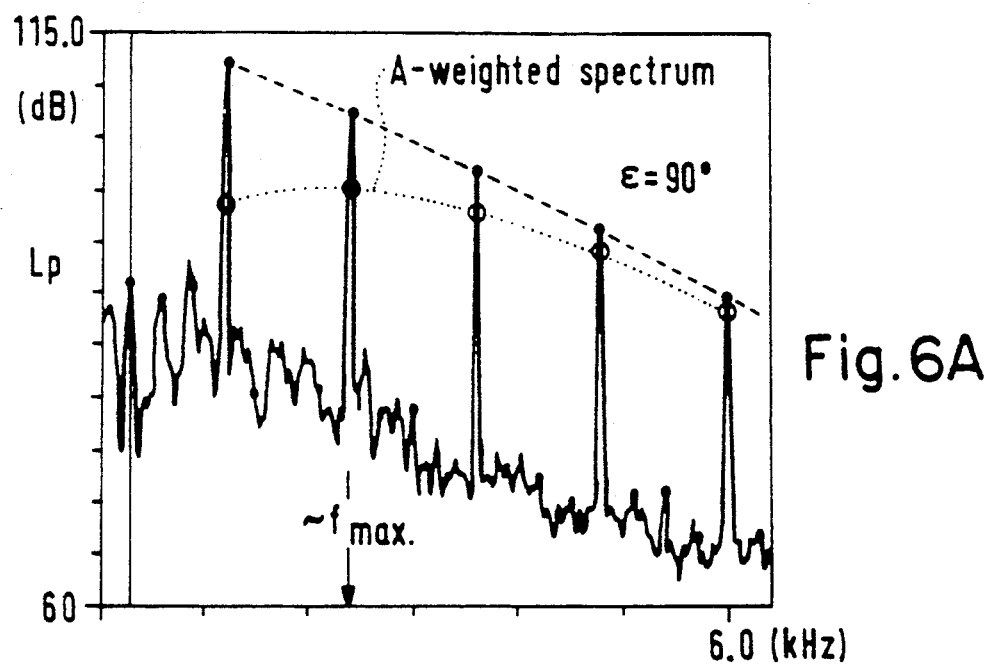
Fig. 6A
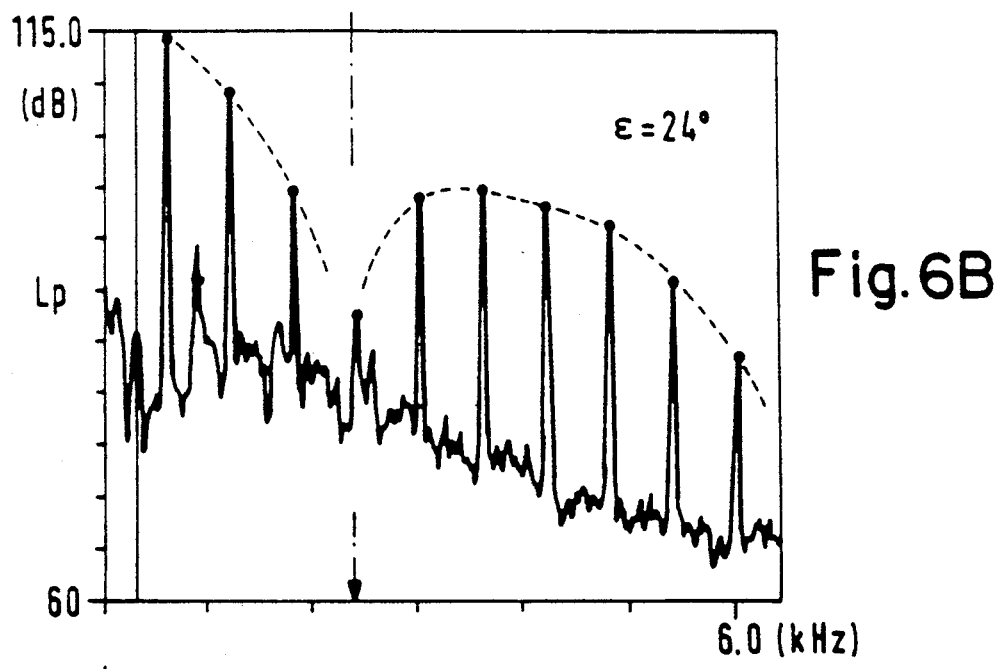
Fig. 6B
Fig. 6C

PROPELLER FOR AIRCRAFT OR THE LIKE

This application is a continuation of prior copending application Ser. No. 259,854, filed Oct. 19, 1988 and now abandoned.

BACKGROUND OF THE INVENTION

The invention relates to propellers, e.g. aircraft propellers having an even number of propeller blades, but at least four propeller blades, which are situated diametrically opposite one another in pairs, and the angles between two adjacent propeller blades are different from 90°.

Propellers dominate as propulsion units for aircraft with cruising speeds below about 300 km/h. In the military range of transport planes and in the civil range of sporting planes and business aircraft, the radiation of noise is regarded as annoying by the population in the vicinity of airfields-not least because of the large number of flight movements.

The radiation of noise from relatively small propeller aircraft in general aviation is based predominantly on the propeller noise. In this case, the radiation of noise depends, in particular, on the Mach number of the blade tips.

Efforts have hitherto been made to reduce the radiation of noise by reducing the Mach number of the blade tips. A reduction in the Mach number of the blade tips is, however, necessarily combined with a loss of propeller thrust. Additional measures therefore have to be taken in order to compensate for these thrust losses.

Thus it is known to reduce the propeller noise of aircraft in general aviation by reducing the speed of rotation (B. Berdrow, "Leiser Antrieb für die allgemeine Luftfahrt", Bonn: BMFT, Abschlußbericht 1976). In order to maintain the thrust, however, this involves an enlargement of the diameter of the propeller and the use of reduction gearing. In many cases, a larger propeller diameter necessitates a higher undercarriage in order to preserve the necessary ground clearance for the propeller. Such a raising of the undercarriage together with the necessary reduction gearing and the larger propeller leads to a distinct increase in mass for the aircraft. This method is therefore only practicable if the necessary clearance for the larger propeller diameter is present and reduction gearing for the propeller is provided in any case (journal "VDI-Nachrichten", No. 12, page 42 /Mar. 20, 1987).

In the case of propellers driven directly, the Mach number of the blade tips can only be reduced by reducing the propeller diameter. In this case, the profile of the propeller blades must be appropriately modified or the propeller blades must be provided with lift aids in order to maintain the thrust.

Summing up, therefore, it can be said that the method of attaining a reduction in the radiation of noise by reducing the Mach number of the blade tips makes it obligatory to effect substantial alterations in the propeller.

In particular, a conversion of existing aircraft becomes very expensive as a result.

A double propeller for the propulsion of aircraft is known having two propellers arranged coaxially and axially offset which can each be driven separately from an associated power unit by means of a central and a hollow shaft. This double propeller preferably propels in the longitudinal axial of the aircraft fuselage and, for the purpose of low noise radiation and an operation which still works reliably even in the event of disturbance of one propeller drive, is constructed in such a manner that the propellers have the same direction of rotation and can be connected to one another, held against relative rotation, in at least one specific relative angular position, by means of a releasable coupling U.S. Pat. No. 4,676,459.

SUMMARY OF THE INVENTION

The present invention seeks to achieve a distinct reduction in propeller noise without alterations in the drive and in the geometry of the propeller blades being necessary and without a reduction in thrust occurring.

According to the present invention, there is provided a propeller having an even number of propeller blades but at least four propeller blades which are mounted for rotation about a common axis and are intended for operation at speeds characterized by respective blade tip Mach numbers in the range of about 0.4 to 0.8, said blades being situated diametrically opposite one another in pairs, wherein the pairs of blades are arranged offset in relation to one another with a spacing angle ($\epsilon$) of between about 15° and 50° between them and with the magnitude of the spacing angle being inversely related to the magnitude of the blade tip Mach numbers to effect a reduction in the level of the rotational sound harmonics by interference.

BRIEF DESCRIPTION OF THE DRAWINGS

A preferred embodiment of the present invention will now be described, by way of example only, with reference to the accompanying drawings, of which:

FIGS. 5 and 5A show an elevational view and a sectional view, respectively, of an arrangement of two two-bladed propellers situated one behind the other in the direction of flight with a spacing angle according to the invention; and FIG. 6 shows measured narrow-band level spectra of the radiation of noise in the plane of rotation of a known propeller—FIG. 6A—and of a propeller according to the present invention—FIG. 6B—and shows an associated model frequency transformation scale in FIG. 6C.

DESCRIPTION OF THE PREFERRED EMBODIMENT

Figure 1:
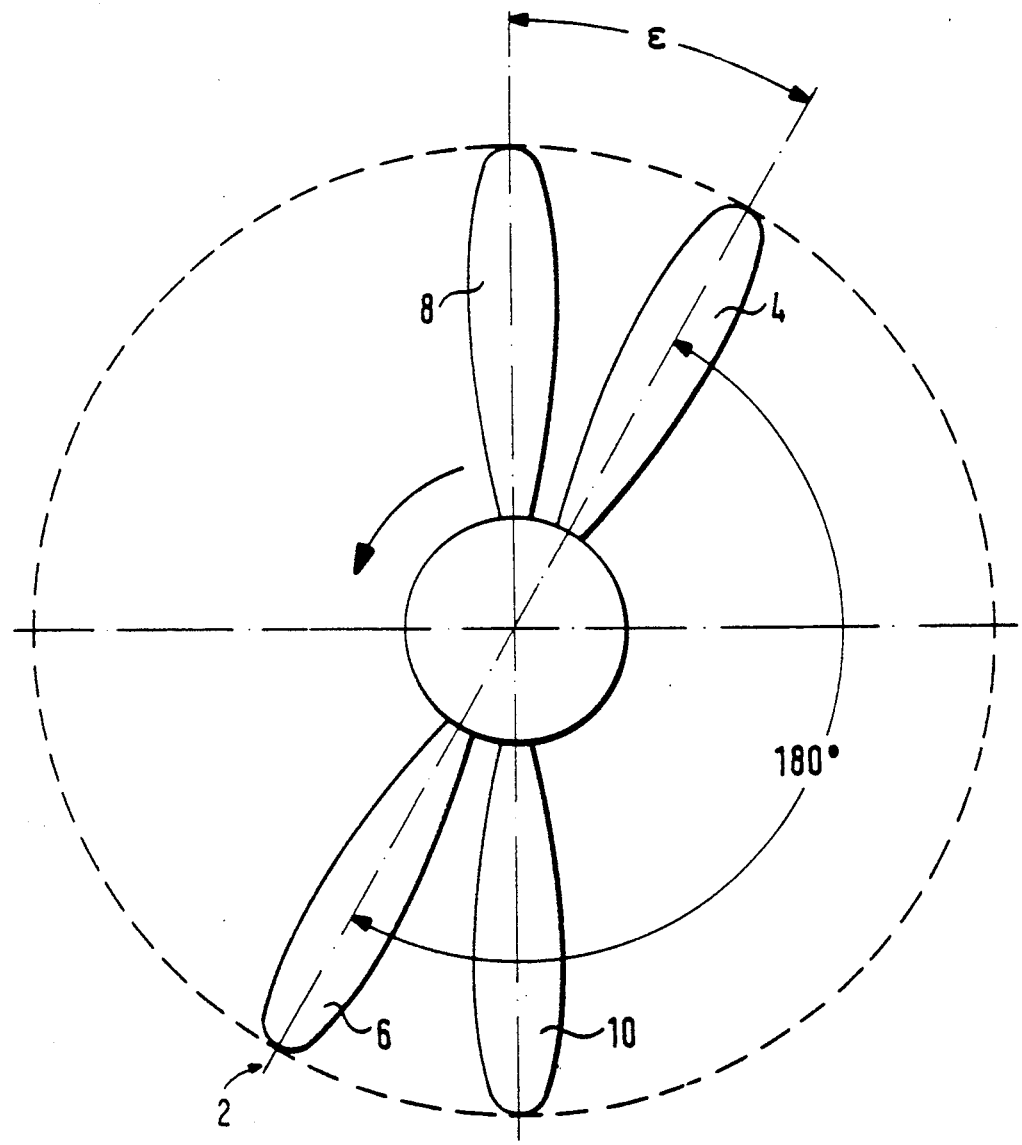
FIG. 1 shows a noise-reducing arrangement of pairs of propeller blades with reference to the example of a four-bladed propeller.

Basically the present invention relates to a propeller having an even number of propeller blades but at least four propeller blades, situated diametrically opposite one another in pairs, wherein the pairs of blades are arranged offset in relation to one another with a spacing angle ($\epsilon$) between about 15° and 50°.

Such an arrangement ensures that the levels of the rotational sound harmonics are weakened by interference. The spacing angle $\epsilon$ corresponds substantially to the relation $$\epsilon = (180°/f_{max})(N/60)$$

where N is the = speed of rotation in r.p.m. and $f_{max}$ is the frequency Hz at which the maximum level occurs in the measured A-weighted narrow-band noise spectrum in the case of a propeller with uniform spacing of the propeller blades. Two two-bladed propellers, which are offset by the spacing angle $\epsilon$ in relation to one another, can be disposed axially one in front of the other on the engine shaft. In this case, the two propellers may be constructed with fixed propeller blades and a transmission may be provided between the two propellers to adjust the spacing angle $\epsilon$. The propellers may also be constructed in the form of variable-pitch propellers. Of the blades succeeding one another at the spacing angle in the circumferential direction, the one which is to the rear in the direction of flight should be arranged leading in the direction of rotation.

The particular advantage of the invention lies in that a distinct, even though limited, reduction in the propeller noise is possible with propellers which are standard for the aircraft to be converted. Thus no new propeller profiles are necessary. The Mach number of the blade tips remains unaltered and hence so does the thrust which can be achieved with the propellers. As mentioned, the reduction in the propeller noise which can be achieved is limited. Nevertheless, reductions in noise of up to 4 dB(A) are to be expected. This means a very considerable reduction in the annoyance of the population caused by noise with an expense which can be borne by the aircraft owner.

In the past years, not only the experimental possibilities for the measuring and analysis of noise but also, in particular, the possibilities for a theoretical treatment of the radiation of propeller noise have been considerably improved. At present, therefore, the radiation of noise from propellers which are operated with Mach numbers of the blade tips below about 0.8 with undisturbed inflow parallel to the axis, can be calculated with satisfactory accuracy (Aircraft Noise Prediction Program-Theoretical Manual, Propeller Aerodynamics and Noise: NASA Technical Memorandum 83199, Part 3, Hampton/Va. 1986).

In the course of this it is found that the helical Mach number of the blade tips (the vector sum of the approach-flow velocity and circumferential speed of the blade tips related to the local velocity of sound) is the parameter dominating the generation of sound as a whole. Furthermore, the radiated noise level rises with increasing aerodynamic blade loading and with the blade thickness. Profile and blade contour shape, on the other hand, essentially only influence the radiation of noise at high helical Mach numbers of the blade tips, that is to say those above 0.7.

With a given thrust, therefore, measures for the reduction of noise involve the use of the thinnest blade profiles possible (with round blade tips) and a limitation of the Mach number of the blade tips as the most essential criterion.

For the reduction of noise of propeller aircraft in accordance with the international recommendations in ICAO, Annex 16, or US-FAR, part 36, the maximum A-weighted total sound pressure level when flying over a standard microphone is the decisive unit of measurement. With reference to this level, there is a tendency towards a reduction in noise with the use of propellers with an increasing number of blades and a larger diameter with the same blade-tip Mach number and the same thrust in each case, provided that there is not a substantial drop below a blade-tip Mach number of about 0.5, below which the broad-band noise of the propeller masks the rotational sound of the propeller.

Referring now to the drawings, the propeller 2 illustrated in FIG. 1 comprises four propeller blades 4, 6, 8, 10 of which two propeller blades at a time, 4 and 6 or 8 and 10, are situated diametrically opposite one another, that is to say they form the angle shown of 180° with one another. In known four-bladed propellers, the individual propeller blades have the same spacing angle $\epsilon$, namely a spacing angle $\epsilon$ of 90°. In the propeller according to the present invention, the two pairs of propeller blades have two different spacing angles between them of which the spacing angle $\epsilon$ is smaller than 50°, preferably smaller than 45°. The optimum spacing angle $\epsilon$ depends on the helical blade-tip Mach number which is determined by the parameters: propeller diameter, speed of rotation of the propeller, flight speed and temperature. For propellers according to the invention, these parameters should be substantially the same as for a normal propeller with an equal spacing angle.

The value of the optimum angle $\epsilon$ depends on the helical blade-tip Mach number. The angle $\epsilon$ is the smaller, the higher the helical blade-tip Mach number M is. Angles of $\epsilon \approx 40°$ with $M \approx 0.5$ are typical for example. Minor deviations from the optimum spacing angle $\epsilon$ of the order of magnitude of about ±5° do not have any appreciable influence on the reduction in noise which can be achieved. They lie substantially within the range of variation of the effective blade-tip Mach number under the various operating conditions. The spacing angle $\epsilon$ can be optimized each time according to the operating state of the propeller drive at which the maximum reduction in noise is required. This may be the take-off for example or the climbing flight after take-off, during which the maximum blade-tip Mach number is normally reached.

The teaching of the invention is based on the fact that the sound pressure signal of a multi-bladed propeller can be generated by superposition—phase-displaced according to the number of blades and the azimuthal blade position—of the sound pressure signal of an individual blade, the maximum sound pressure amplitudes occurring each time in the interval of time in which a blade moves towards the observer. By phase displacement in time in relation to one another of the individual blade sound pressure signals emitted during one rotation of the propeller, interference minima are produced in the sound pressure level spectrum in such a manner that the frequency of the first minimum substantially coincides with the frequency of the spectral maximum of the A-weighted level spectrum of the rotational sound harmonics.

Appropriate phase displacements are achieved, as mentioned already above, by starting from the uniform (azimuthal) blade spacing usual in multi-bladed propellers. In order to avoid imbalance problems in this case, or to be able to continue to use the identical propeller blades, an unequal blade spacing angle $\epsilon$ should only apply to pairs of blades 4, 6; 8, 10, each of which has its two blades situated at 180° in relation to one another, as illustrated in FIG. 1. Thus the invention is restricted to propellers with at least four blades and a number of blades divisible by 2.

The spacing angle ε formed by the two pairs of blades 4, 6; 8, 10 in a four-bladed propeller can be optimized with regard to the minimum radiation of propeller noise. In this case, the reduction in the A-weighted total sound pressure level which can be achieved is related to the corresponding noise level of a conventional propeller with a spacing angle ε=90°, which has the same blade profile and the same diameter and is operated at the same speed of rotation at the same flight speed. The reduction in the sound pressure level depends essentially on the speed of rotation of the propeller and the propeller diameter of the original propeller. Thus, on the one hand the characteristic curve of the propeller rotational sound spectrum is determined by the helical blade-tip Mach number (that is to say substantially dependent on speed of rotation and diameter) and on the other hand the frequency position of the harmonics— —and hence the effect of the A-weighting—is determined by the speed of rotation and number of blades.

If the speed of rotation of the propeller deviates from the design value, either the set spacing angle ε must be readjusted to a new, optimum value—corresponding to the altered operating conditions—or a reduction in the maximum reduction in noise which can be achieved must be accepted into the bargain.

Figure 2:
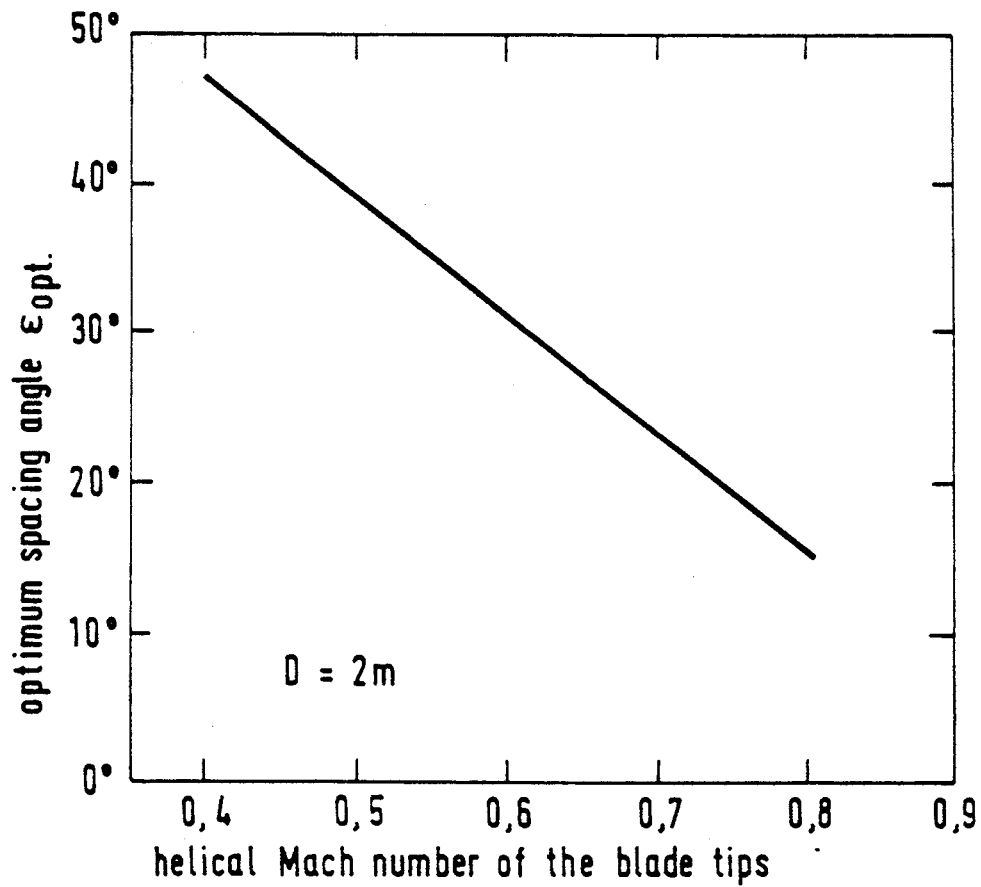
FIG. 2 shows, in a graph, the calculated dependence of the optimum blade spacing angle on the helical Mach number of the blade tips for a four-bladed propeller.

FIG. 2 shows, by way of example, the typical dependence of the optimum spacing angle ε on the helical blade-tip Mach number, calculated for a four-bladed propeller. According to this, the value of the optimum angle ε becomes smaller as the blade-tip Mach number increases, and it assumes higher values as the blade-tip Mach number drops. The angles already mentioned above of $\epsilon \approx 20°$ with $M \approx 0.7$, or $\epsilon \approx 40°$ with $M \approx 0.5$ with deviations of ±5° are typical.

Figure 3:
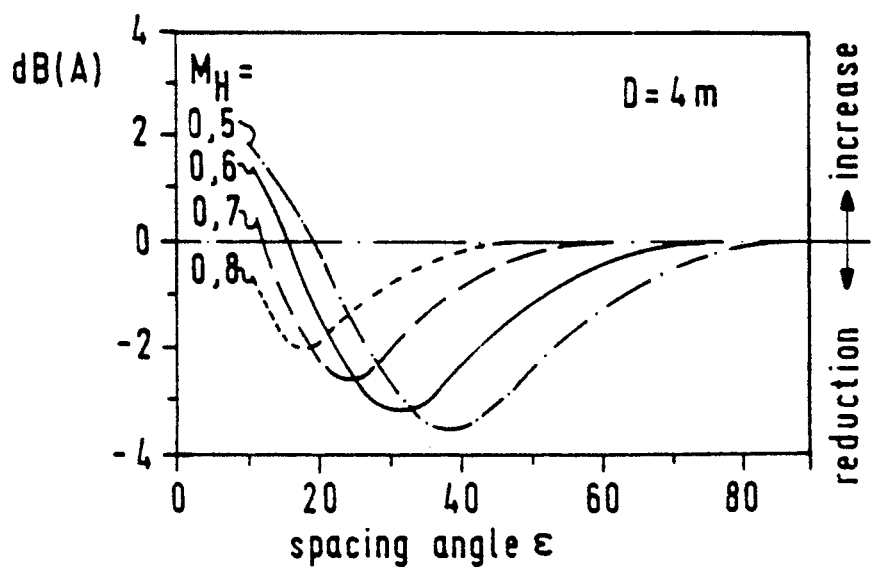
FIG. 3 shows, in a graph, calculated A-sound level reductions (negative level differences) depending on the blade spacing angle and the helical Mach number of the blade tips for a four-bladed propeller.
Figure 4A:
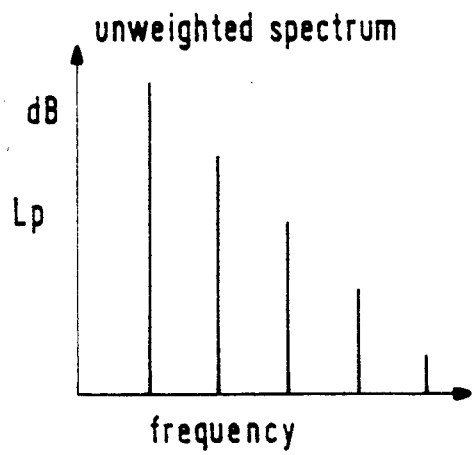
FIG. 4 shows, in comparison, schematic graphs of the unweighted and of the A-weighted spectrum of known propellers —FIGS. 4A and 4B—and of propellers according to the invention—FIGS. 4C and 4D.
Figure 4B:
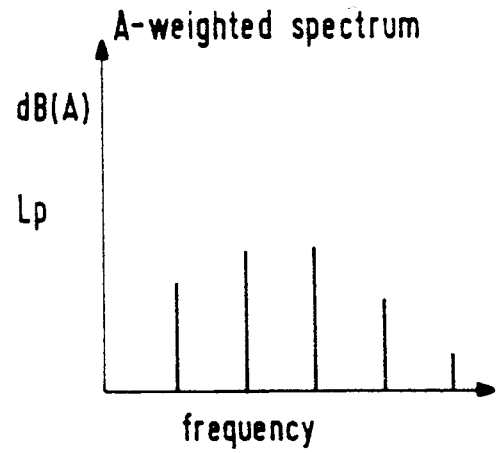
Figure 4C:
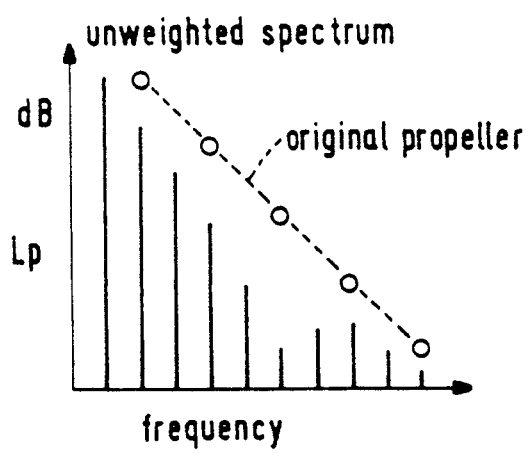
Figure 4D:
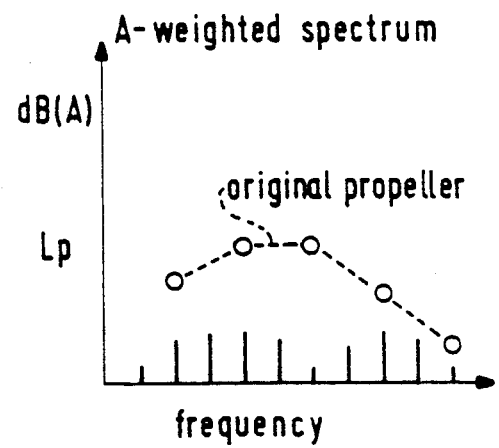

The graph shown in FIG. 3 shows typical calculated A-sound level reductions (negative level difference relative to the radiation of noise by a four-bladed propeller with ε=90°) for a propeller with a diameter of 4 m, depending on the spacing angle ε and the blade-tip Mach number $M_H$. The increases in A-sound level illustrated in the graph for small angles (ε<20°) are attributed exclusively to acoustic interactions. An aerodynamic interference which may possible be expected with very small spacing angles is not taken into consideration. As can be seen from FIG. 3, the optimum spacing angle for $M_H=0.5$ is $\epsilon \approx 40°$, for $M_H=0.6$ it is $\epsilon \approx 30°$, for $M_H=0.7$ it is $\epsilon \approx 23°$ and for $M_H=0.8$ it is $\epsilon \approx 18°$. The reduction in sound level which can be achieved decreases as the blade-tip Mach number increases, and at $M_H=0.5$ it is $\approx 3.8$ dB(A) and at $M_H=0.8$ it is $\approx 2$ dB(A).

The potential reduction in noise resulting through acoustic interference in cooperation with the A-weighting function rises at low helical blade-tip Mach numbers because in this case the levels of the rotational sound harmonics drop very quickly as the ordinal number (frequency) increases. As a result of this, the A-weighted total sound pressure level is determined almost exclusively by the level of a single harmonic, the reduction of which, due to interference, can then come fully into force.

In calculated examples and those checked experimentally (on a model scale), reductions in level through this interference effect of up to 4 dB(A) were achieved. Such a reduction may be decisive for example with the laws applying in the relevant country for approval as a so-called low-noise aircraft. Substantially higher reductions in level as a result of the "subharmonics" which additionally appear are not to be expected. Thus in the case of a four-bladed propeller with ε<90° in comparison with the original propeller with ε=90°, double the number of rotational sound harmonics result, in accordance with the spectrum of a two-bladed propeller, as represented in FIG. 4.

FIG. 4 shows, with reference to schematic propeller rotational sound spectra, the effect of the interference effect on which the invention is based. In FIG. 4A, the unweighted and in FIG. 4B the A-weighted spectrum of a conventional four-bladed propeller with a spacing angle ε=90° are represented. In FIGS. 4C and 4D the corresponding spectra for a four-bladed propeller with an optimized spacing angle ε according to the invention are illustrated, together with the values given in FIGS. 4A and 4B. The reduction in noise which can be achieved can clearly be seen in the two graphs in FIGS. 4C and 4D.

Since the reduction in noise which can be achieved and the value of the associated angle ε depend essentially on the drop in the level of the harmonics over the frequency, appropriate predictions can be made for every application on the basis either of a calculation of the propeller noise or corresponding experimental investigations.

In order to make use of the invention, the "minimum noise" spacing angle ε is determined in accordance with the geometrical and operational propeller parameters, for example for a four-bladed propeller, and the propeller blades (identical to those of the conventional four-bladed propeller) are mounted on the hub at this spacing angle ε.

The propeller configuration illustrated in FIG. 5 can be realized for example by means of two conventional two-bladed propellers, the planes of rotation of which should be offset slightly as shown in FIG. 5A because of the specific radiation characteristics of the propeller noise (the maximum of the A-weighted total sound pressure level generally occurs—depending on the operating parameters—behind the plane of rotation in the direction of flight). By this means—particularly with small angles ε—constructional problems with regard to the fixing of the roots of the blades in variable-pitch propellers are avoided. In the case of rigid propellers there is also the simple possibility, for the example selected, of mounting two conventional two-bladed propellers axially immediately one in front of the other on the drive shaft.

Furthermore, in the case of pairs of propellers disposed axially one in front of the other, in the event of a variable speed of rotation of the propellers in flight, a re-adjustment of the spacing angle ε to the particular acoustically optimum value depending on the current speed of rotation of the propellers can be effected via an adjustment mechanism (not shown) disposed between the two two-bladed propellers. This is scarcely necessary for variable-pitch propellers with their control of the blade angle depending on load since here the speed of rotation of the propellers is almost constant over a wide operating range.

In order to achieve great take-off thrust there is the further possibility, with pairs of blades arranged axially one in front of the other, of setting suitable azimuthal blade arrangements in this sense.

With pairs of propellers arranged axially offset, care must be taken, for acoustic reasons, to ensure that of the blades following one another at the angle ε in the circumferential direction, the one which is to the rear in the direction of flight leads in the direction of rotation, as illustrated in FIG. 5A, in order to avoid with certainty a possible aero-acoustic interaction of the flow wake on the front blade with the rear blade. When determining the optimum angle ε, the most favourable or permissible axial offsetting of the planes of rotation on the basis of the associated radiation directional characteristic must be taken into consideration.

The precise determination of the most favourable spacing angle in each case can be effected either empirically on the basis of noise measurements or by means of a suitable method of calculating propeller noise, for example by the method given in NASA's above-mentioned "Aircraft Noise Prediction Program" (ANOPP). On the other hand, the optimum spacing angle from the noise point of view can be determined very simply if there is an A-weighted narrow-band level spectrum of the sound radiation of the original propeller (ε=90°) available from flight measurements (measurement results from stationary tests are unsuitable) at the propeller speed to be considered. In this case, the optimum spacing angle can be determined approximately in accordance with the relationship $$\epsilon = (180°/f_{max})(N/60).$$

In this formula, N is speed of rotation in r.p.m. and $f_{max}$ is that frequency (in Hz) at which the level maximum occurs in the measured or calculated A-weighted narrow-band spectrum for a propeller with uniform spacing of the propeller blades.

The invention can also be applied to propellers which operate in a disturbed inflow. In this case, however, the reduction in noise which can be achieved and the associated azimuthal spacing angle ε can only be determined by experimental tests.

Experimental tests were carried out with ordinary commercial two-bladed propellers for model aircraft. Propellers of the type "Super 25-8" (Messrs. Gaupner) with a 25 cm diameter and an 8 cm pitch (axial "advance") per revolution were used. In order to simulate the condition of flight, the propellers were driven by an electric motor in a low-noise and low turbulence stream of air of 30 m/s (free-jet test bed), at a speed of rotation of N=180,060 r.p.m. corresponding to a helical blade-tip Mach number of 0.695.

It is possible to transfer measured values of propeller noise from model experiments to the full-scale construction, apart from extreme operating conditions, with sufficient accuracy if the same blade-tip Mach numbers are adhered to in each case. For this purpose, the (smaller) model propeller must be operated at a correspondingly higher speed of rotation as a result of which, higher frequency values result for the rotational sound harmonics of the propeller noise in accordance with the model scale. A frequency transformation is therefore necessary before calculating an A-weighted total sound pressure level.

FIG. 6 shows examples of model measurement results (un-weighted narrow-band level spectra) for the conventional four-bladed propeller ε=90° (FIG. 6A), and a propeller according to the invention with a spacing angle ε=24° (FIG. 6B). In the spectrum of the propeller according to the invention, the interference minimum is clearly visible, the frequency position of which can be calculated by means of the spacing angle selected and the speed of rotation.

In order to determine the reduction in noise to be achieved with the corresponding interference propeller of 2 m diameter, with regard to the A-weighted total sound pressure level (related to the radiation of noise by a conventional propeller), the frequency scales of the measured spectra must first be multiplied by the model scale (here 0.125=0.25 m/2.0 m) (frequency transformation).

A corresponding scaling is additionally given in FIG. 6C by way of illustration. Then the spectra can be subjected to the A-weighting and the total sound pressure level can be calculated by summation of the sqares of the sound pressures (RMS values) of the rotational sound harmonics. For the example shown, this results in a reduction of noise of about 3 dB(A) if a propeller diameter of 2 m is assumed for the full-scale construction.

In addition to the application of the invention to aircraft propellers, the reduction in noise caused by interference as described can also be achieved in high-speed axial-flow blowers and fans.

It will be understood that the above description of the present invention is susceptible to various modifications, changes and adaptations.

What is claimed is:

1. A propeller having an even number of propeller blades, which are at least four in number, mounted for rotation about a common axis and being intended for operation at speeds characterized by respective blade tip Mach numbers in the range of about 0.4 to 0.8, said blades being situated diametrically opposite one another in pairs, said blade pairs being arranged offset in relation to one another with a spacing angle (ε) of between about 15° and 50° between them, and the magnitude of said spacing angle being inversely related to the magnitude of said blade tip Mach numbers, thereby to effect a reduction in the level of the rotational sound harmonics by interference.

2. A propeller according to claim 1, wherein the magnitude of said spacing angle (ε) between the two blade pairs corresponds substantially to the relation $$(\epsilon) = (180°/f_{max})(N/60)$$

where N is the propeller speed in r.p.m. and $f_{max}$ is the frequency in Hz at which the level maximum occurs in the measured A-weighted narrow-band noise spectrum of a propeller having a like number of blades but with a uniform angular spacing of all of the individual propeller blades from one another.

3. A propeller according to claim 1, comprising two two-bladed propeller elements, said propeller elements being offset in relation to one another by the spacing angle (ε) and being disposed axially one in front of the other for rotation in separate planes of rotation spaced a short distance from one another along said axis of rotation.

4. A propeller according to claim 3, wherein of each two blades which follow one another at the spacing angle as viewed in the circumferential direction the blade which is to the rear of the other blade as viewed axially is arranged to lead said other blade as viewed in the direction of rotation.

5. An aircraft having at least one propeller, said at least one propeller having an even number of propeller blades, which are at least four in number, mounted for rotation about a common axis and being intended for operation at speeds characterized by respective blade tip Mach numbers in the range of about 0.4 to 0.8, said blades being situated diametrically opposite one another in pairs, said blade pairs being arranged offset in relation to one another with a spacing angle ($\epsilon$) of between about 15° and 50° between them, and the magnitude of said spacing angle being inversely related to the magnitude of said blade tip Mach numbers, thereby to effect a reduction in the level of the rotational sound harmonics by interference.

6. A blower or fan having at least one propeller, said at least one propeller having an even number of propeller blades, which are at least four in number, mounted for rotation about a common axis and being intended for operation at speeds characterized by respective blade tip Mach numbers in the range of about 0.4 to 0.8, said blades being situated diametrically opposite one another in pairs, said blade pairs being arranged offset in relation to one another with a spacing angle ($\epsilon$) of between about 15° and 50° between them, and the magnitude of said spacing angle being inversely related to the magnitude of said blade tip Mach numbers, thereby to effect a reduction in the level of the rotational sound harmonics by interference.

* * * * *